United States Patent [19]

Getson, Jr. et al.

[11] Patent Number: 4,972,313
[45] Date of Patent: Nov. 20, 1990

[54] BUS ACCESS CONTROL FOR A MULTI-HOST SYSTEM USING SUCCESSIVELY DECREMENTED ARBITRATION DELAY PERIODS TO ALLOCATE BUS ACCESS AMONG THE HOSTS

[75] Inventors: Edward F. Getson, Jr., Peabody; William L. Saltmarsh, Brockton, both of Mass.

[73] Assignee: Bull HN Information Systems Inc., Billerica, Mass.

[21] Appl. No.: 390,583
[22] Filed: Aug. 7, 1989
[51] Int. Cl.$^5$ ............................................. G06F 15/16
[52] U.S. Cl. ................................. 364/200; 364/228.3; 364/242.6; 364/242.92
[58] Field of Search ... 364/200 MS File, 900 MS File; 370/85

[56] References Cited

U.S. PATENT DOCUMENTS

| | | | |
|---|---|---|---|
| 4,161,024 | 7/1979 | Joyce et al. | 364/200 |
| 4,167,781 | 9/1979 | Beccia et al. | 364/200 |
| 4,365,294 | 12/1982 | Stokken | 364/200 |
| 4,481,626 | 11/1984 | Boggs et al. | 370/85 |
| 4,539,677 | 9/1985 | Lo | 370/85 |
| 4,550,402 | 10/1985 | Gable et al. | 370/85 |

Primary Examiner—Raulfe B. Zache
Attorney, Agent, or Firm—Gary D. Clapp; John S. Solakian

[57] ABSTRACT

Any host requesting acccess to the bus must, on its first attempt, wait for N arbitration delay periods after the bus becomes available before attempting to take control of the bus. If another host takes the bus before completion of the arbitration delay period, the host must wait till the next time the bus becomes available. The arbitration delay count is decreased by one for each successive attempt, until the host either gains control of the bus or the aribration delay period goes to zero. At this point it may attempt to take control of the bus as soon as the bus becomes available. If another higher priority host reaches an arbitration delay count of zero during the same arbitration delay count period, the host will be denied and will wait for the next time the bus becomes available, again with an arbitration delay count of zero. The host in question will eventually gain control of the bus as each higher priority host which has denied it access to the bus must begin its next attempt at gaining the bus with a delay count of N. The host in question will thereby eventually be the highest priority host which has reached an arbitration delay count of zero.

14 Claims, 4 Drawing Sheets

BUS ACCESS CONTROL FOR A MULTI-HOST SYSTEM USING SUCCESSIVELY DECREMENTED ARBITRATION DELAY PERIODS TO ALLOCATE BUS ACCESS AMONG THE HOSTS

CROSS REFERENCES TO RELATED APPLICATIONS

The following patent applications, which are assigned to the same assignee as the present patent application, contain related subject matter:

U.S. Pat. application No. 295,335 for Peripheral Controller with Paged Data Buffer Management, by E. F. Getson, Jr., et al., filed Jan. 10, 1989;

U.S. Pat. application No. 295,629 for Multiprocessor Controller Having Shared Control Store, by E. F. Getson, Jr. et al., filed Jan. 10, 1989;

U.S. Pat. application No. 295,318 for Controller Having an EEPROM Firmware Store, by E. F. Getson, Jr., et al., filed Jan. 10, 1989; and, U.S. Pat. application No. 295,639 for Method and Apparatus for Limiting the Utilization of an Asynchronous Bus with Distributed Controller Access, by G. J. Barlow, et al., filed Jan. 10, 1989.

BACKGROUND OF THE INVENTION

Field of Use

The present invention relates generally to data processing systems and, in particular, to controlling access to a bus connecting multiple hosts in a data processing system.

Prior Art

Many present data processing systems are comprised of a number of host processors which may operate either cooperatively or independently to perform data processing tasks. These host processors are interconnected through a bus system through which the processors communicate with one another, for example, to exchange data or to coordinate their operations.

A recurring problem in such systems is controlling and allocating access to the bus among the host processors in an equitable and efficient manner. For example, in polling systems a master host polls each host processor in sequence to ask which hosts have a present need for bus access. In token ring systems, a "token" carrying the right of bus access is passed in turn among the host processors. While each of these systems of the prior art insure that each host processor will have access to the bus, significant time is spent polling or passing the token to hosts that do not require access, while those host having need of access are forced to await their turn. Such systems thereby tend to be inefficient in that they reduce the maximum data transfer rate of the bus. Another disadvantage of such systems is that the entire system may fail if the polling master fails or if a host processor fails such that it cannot pass the token to the next host.

Yet other systems of the prior art attempt to solve these problems by allowing any host to request access to the bus at any time. This approach naturally results in conflicts among requests for bus access and such systems normally include some means for resolving such conflicts. The most common method is to assign each host a priority relative to the other hosts and granting access according to the relative priorities of the requesting hosts. The inherent problem in such approaches is that a small number of active, high priority hosts can, in effect, take control of the bus and deny access to the lower priority hosts.

SUMMARY OF THE INVENTION

In the bus access control method and apparatus of the present invention, any host requesting access to the bus must, on its first attempt to gain control of the bus, wait for N arbitration delay periods after the bus becomes available before attempting to take control of the bus. If another host takes the bus before completion of the N arbitration delay periods, the host must wait till the next time the bus becomes available.

On the second attempt, however, the host must wait only N-1 arbitration delay periods before attempting to take control of the bus. This will continue each time the bus becomes available, with the arbitration delay count being decreased by one for each successive attempt, until the host either gains control of the bus or the arbitration delay period goes to zero. At this point, the host need not delay when the bus becomes available, but may attempt to take control of the bus as soon as the bus becomes available.

The host may still be denied access to the bus if another host which has been assigned a higher priority reaches an arbitration delay count of zero during the same arbitration delay count period. In this instance, the denied host will again wait for the next time the bus becomes available, again with an arbitration delay count of zero, and may again attempt to take control of the bus, unless again denied by another higher priority host which has reached an arbitration delay count of zero. It should be noted, however, that the host in question will eventually gain control of the bus. Each higher priority host which has denied it access to the bus by also reaching an arbitration delay count of zero must begin its next attempt at gaining the bus with a delay count of N. The host in question will thereby eventually be the highest priority host which has reached an arbitration delay count of zero. In order to insure that this occurs, N would usually be set to be equal to the number of hosts on the bus, and usually would be equal to the maximum number of host which could be connected to the bus. In the case of a SCSI bus complying with the Small Computer System Interface (SCSI) specification, ANSI Specification X3.131, for example, N would therefore generally be set as 8 as a SCSI bus can support up to 8 hosts.

The present invention thereby provides a solution to the problems of the prior art in that no host may be barred from access to the bus for an excessive period and that the system will not fail due to a failure of a single host therein.

It is thereby an object of the present invention to provide an improved method and apparatus for controlling access to a bus by a number of hosts sharing the bus.

It is another object to provide an improved method and apparatus for controlling access to a bus wherein no host may be barred from access to the bus for an excessive period.

It is yet another object of the present invention to provide an improved method and apparatus for controlling access to a bus wherein the failure of one or more hosts connected to the bus will not result in a failure of the remaining hosts to communicate through the bus.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE PREFERRED EMBODIMENTS

A. Description of System 10 [FIG. 1]

Figure 1:
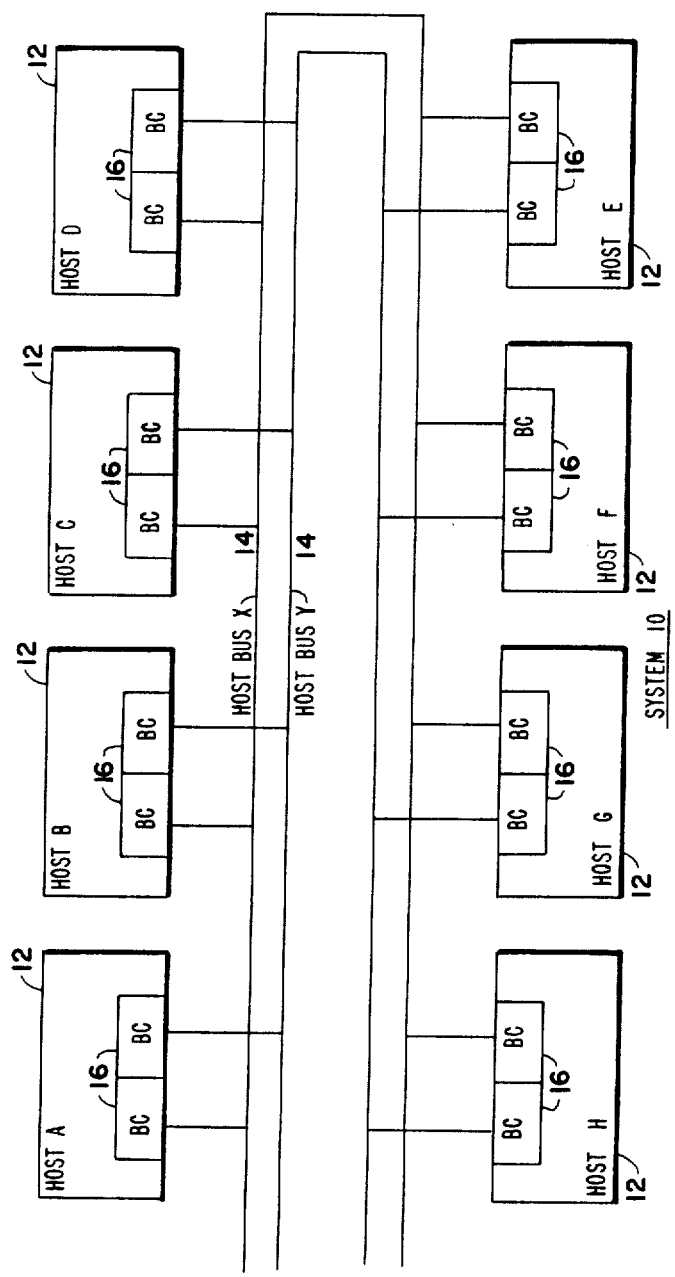
FIG. 1 is a block diagram of an exemplary system incorporating the present invention.

Referring to FIG. 1, therein is represented an exemplary System 10 incorporating the present invention. As shown, System 10 includes a number of Host Processors (Hosts) 12, eight in the present example and respectively designated as Host 12-A through Host 12-H. System 10's Hosts 12 are interconnected through two identical, parallel, independent Host Buses 14, designated respectively as Host Bus 14-X and Host Bus 14-Y. Each Host 12 includes two Bus Controllers (BCs) 16, one connecting the respective Host 12 to Host Bus 14-X and the other to Host Bus 14-Y, and each Host 12 may communicate with any other Host 12 through either of the Host Buses 14.

The provision of a single Host Bus 14 and a single BC 16 in each Host 14 would be sufficient for basic host to host communication in System 10 by allowing communication between any pair of Hosts 12 at any given time. The provision of two Buses 14 and a pair of BCs 16 in each Host 12 substantially increases the host to host data exchange of System 10, however, by allowing any two pairs of Hosts 12 to communicate at any given time. In yet other embodiments of System 10, a third or even fourth Host Bus 14 may be added, with a corresponding increase in BCs 16 in the Hosts 12, to allow concurrent communication between, respectively, three and four pairs of Hosts 12. In yet further embodiments of System 10, the Hosts 12 and the BCs 16, described further in the following, are programmed to allow each Host 12 to conduct concurrent communications with any two other Hosts 12, thereby providing maximum flexibility in host to host communication.

B. Description of Host 12 [FIG. 2]

Figure 2:
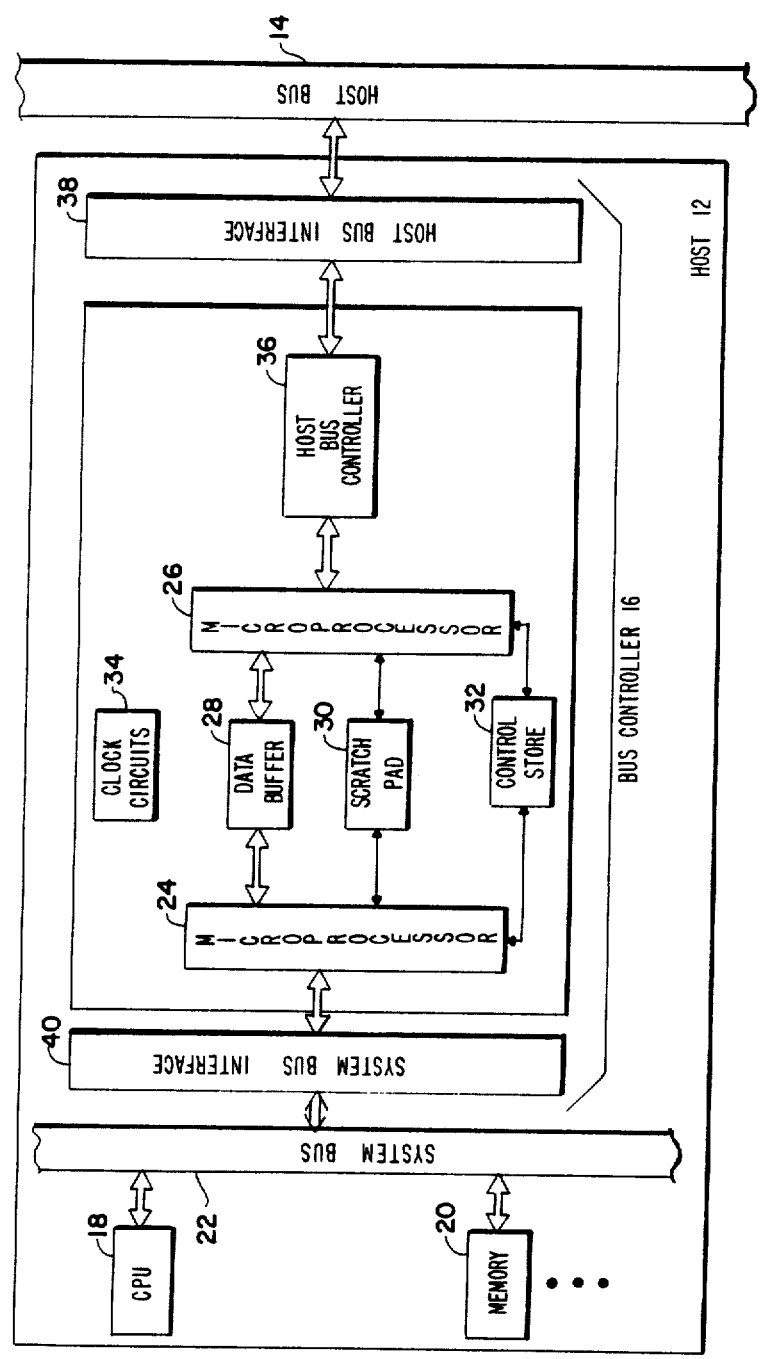
FIG. 2 is a block diagram representation of a bus interface and controller incorporating the present invention.

Referring to FIG. 2, therein is represented a single Host 12 with a single Bus Controller (BC) 16 connecting the Host 12 to one of Host Buses 14. Host 12 is represented as including, for example, a Central Processing Unit (CPU) 18 and a Memory 20. A System Bus 22 provides communication between the elements of Host 12, such as CPU 18 and Memory 20, and between these elements and BC 16.

Referring to BC 16 in FIG. 2, BC 16 is shown as including a Microprocessor 24 and a Microprocessor 26, both connected to a Data Buffer 28. Microprocessor 24 controls and performs data transfers between System Bus 22 and Data Buffer 28 while Microprocessor 26 performs the same function with respect to data transfers between Host Bus 14 and Data Buffer 28. A transfer of data from, for example, System Bus 22 to Host Bus 14, is comprised of a data transfer from System Bus 22 to Data Buffer 28 through and under the control of Microprocessor 24, and a subsequent data transfer from Data Buffer 28 to Host Bus 14 through and under the control of Microprocessor 26.

A Scratch Pad Memory 30 is provided for the exchange of control and coordination information between Microprocessors 24 and 26. The operations of Microprocessors 24 and 26 are controlled by program routines, that is, sequences of instructions, stored in Control Store 32, and by timing signals generated by Clock Circuits 34.

Control and data inputs and outputs of Microprocessor 26 are connected to data and control inputs and outputs of Host Bus Controller (HBC) 36, and inputs and outputs of HBC 36 are in turn connected to Host Bus 14 through Host Bus Interface (HBI) 38. In the present exemplary system, Host Bus 14 complies with the Small Computer System Interface (SCSI) specification, ANSI Specification X3.131. HBC 36 is correspondingly, and for example, a Western Digital 3392 SCSI Controller chip, which executes SCSI bus data transfer, command and protocol operations under the control of Microprocessor 26. HBI 38, in turn, contains circuitry for interfacing HBC 36 with Host Bus 14.

In a similar manner, the control and data inputs and outputs of Microprocessor 24 are connected to System Bus 22 through a System Bus Interface (SBI) 40. SBI 40 performs the same type of interface and control functions as HBC 36 and HBI 38, but conforms to the data, command and protocol specifications of System Bus 22.

C. Description of Bus Access Control Method [FIG. 3]

Figure 3:
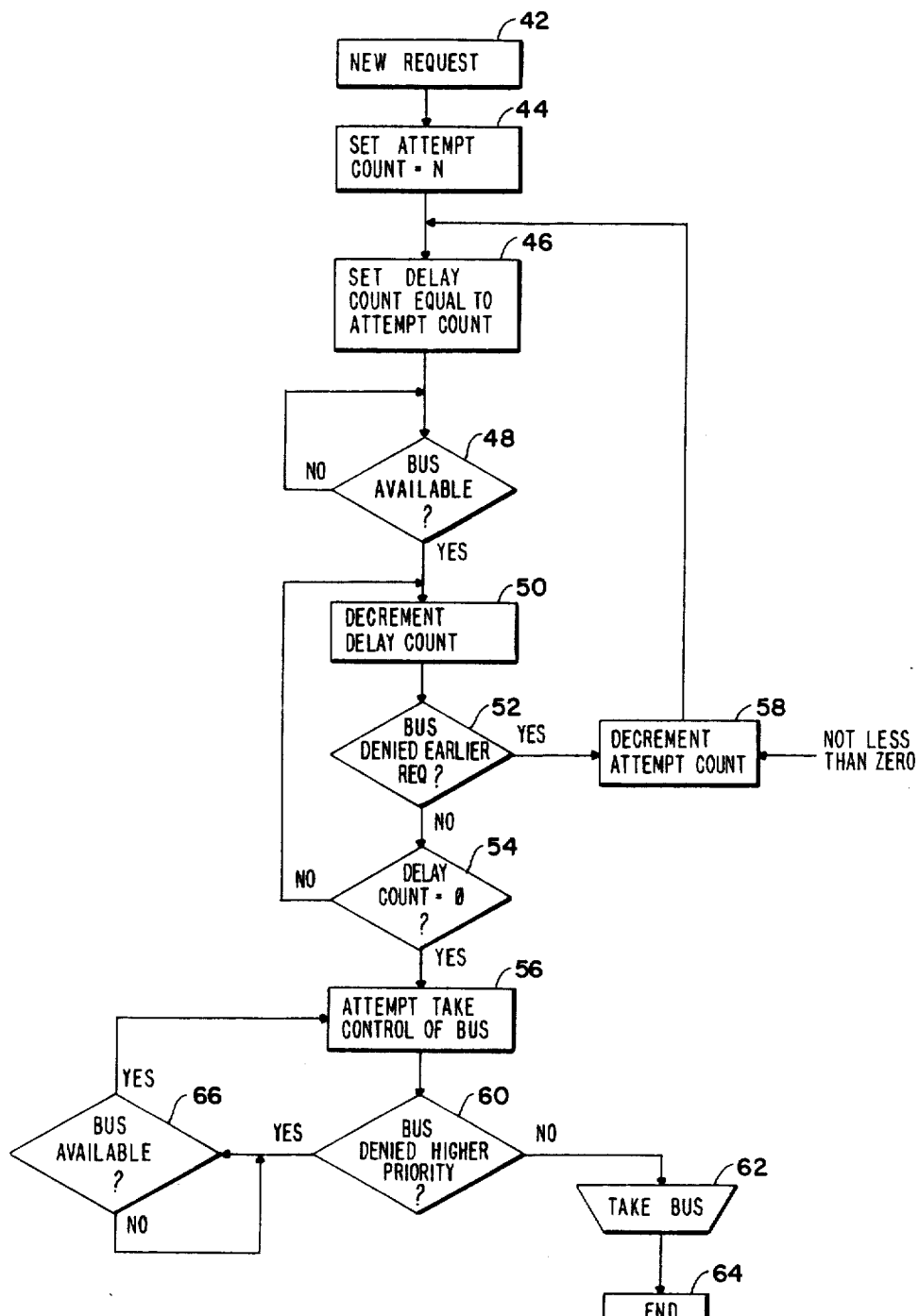
FIG. 3 is a flow diagram illustrating the operation of the bus interface and controller of FIG. 2 according to the present invention; and, FIG. 4 is a diagrammatic representation of the functional elements to perform the bus access control operations of the present invention.

Referring to FIG. 3, therein is shown a flow diagram illustrating the operations of BC 12, and in particular Microprocessor 26, HBC 36 and HBI 38, to control accessing of Host Bus 14 by a Host 12 according to the present invention. Before discussing FIG. 3, however, a brief description of the operation of Host Bus 14 will be of assistance in understanding the flow of operations shown in FIG. 3. The description of the operation of the bus itself will cover only those aspects of the bus directly relative to the operation of the present invention and reference is made to the Small Computer System Interface (SCSI) specification, ANSI Specification X3.131, for a complete description of the bus.

C.1 Description of Host Bus 14

First considering Host Bus 14, as described Host Bus 14 in the exemplary System 10 is a SCSI bus and is thus comprised of a number of data lines, a Select (SEL) control line and a BUSY control line. A host having control of the bus holds the SEL and BUSY lines at a logical high signal level to indicate to all other hosts that the bus is presently in use, and allows the SEL and BUSY lines to go to logic low level when the bus operation is complete. The bus is defined to be available for a bus operation, that is, a data transfer by that or a different host, at the end of any 800 nanosecond (ns) period in which SEL and BUSY have both been continuously low. At that point, any host may claim control of the bus by forcing a high on the BUSY line and placing its identification bit on the data line corresponding to that host. In this regard, it should be noted that the bus data lines are used to carry data during the data transmission phase of a bus operation, and to carry host identifications during the bus request and acquisition phase; each host is assigned a single bus data line and identifies itself by asserting a logic high on that line.

C.2 Description of Bus Access Control

Referring now to FIG. 3, the above described bus access method is described in the form of a flow diagram. As shown, a bus operation begins at Step 42 with the Host 12 generating a request for a bus operation. This results in the Attempt Count being set to the initial value of N in Step 44 wherein N is the number of arbitration delay periods the host must wait before attempting to take control of the bus. The Delay Count is also set to the initial value of N, in Step 46.

The bus controller then checks to determine whether the bus is available in Step 48. If the bus is not available, the process remains in Step 48 until the bus is available, periodically checking the status of the bus. When the bus becomes available, the process proceeds to Step 50, where the Delay Count is Decremented by one, and then to Step 52 where the process determines whether the host has been denied access to the bus during this Delay Count because another host has reached a Delay Count of zero.

If another host has not yet taken control of the bus, the process will proceed to Step 54 to determine whether the Delay Count has yet reached zero. If the Delay Count has not yet reached zero, the process returns to Step 50, where the Delay Count is decremented by one. The process will continue around the loop comprised of Steps 54, 50 and 52 until either the Delay Count reaches zero, whereupon the process branches to Step 56, or another host takes control of the bus before the Delay Count reaches zero. In the second event, the process will enter the loop starting with Step 58 to begin a new attempt to gain control of the bus.

If another host has taken control of the bus before this host has reached a Delay Count of zero, the process branches to Step 58 wherein the Attempt Count number N is decremented by one. That is, the required arbitration delay for the next attempt to take control of the bus is reduced by one delay count period. The process then goes to Step 46, where the Delay Count is set to equal the new, decremented Attempt Count number N for the next attempt to gain control of the bus. The process then again proceeds to Step 48 until the bus again become available. It should be noted that as described, the Attempt Count may decrement only to zero. This condition is noted in Step 58 by the condition that Step 58 is Not Less Than Zero.

Each time the host is denied access to the bus before its Delay Count reaches zero, the process will execute the loop comprised of Steps 58, 46, 48, 50 and 52. The Attempt Count number, and correspondingly the Delay Count number and the arbitration delay, are decremented with each new attempt to take control of the bus, that is, with each cycle around Steps 58, 46, 48, 50 and 52. The Delay Count will therefore eventually reach zero, even if other hosts take control of the bus before the Delay Count is decremented to zero through the loop of comprised of Steps 54, 50, and 52. As described, a Delay Count of zero, and thus the branch to Step 56, may occur through either of two events; that is, either a non-zero Delay Count has been decremented to zero by the loop described just above or the Attempt Count, and thus the corresponding Delay Count for that attempt, has decremented to zero.

In Step 56 the hosts attempts to take control of the bus, which includes resolving any relative priority conflicts between those hosts which have concurrently reached Delay Counts of zero, so that the host having the highest relative priority takes control of the bus. The results of the Step 56 attempt to take control of the bus, and the outcome of the resolution of any conflicts, is tested in Step 60.

Step 60 has two possible branches. If the host in question has the highest priority at this point, that host process proceeds to Step 62, taking control of the bus and executing a bus operation, and ending the process at Step 64 with completion of the bus operation.

If the host in question does not have the highest priority of the hosts having a Delay Count of zero, the process branches to Step 66 where it waits until the next time the bus is available to again contest relative priorities. The host will remain in the Step 56 and Step 66 loop until it is the highest priority host having a Delay Count of zero and may proceed to Step 62.

D. Embodiments of the Invention [FIG. 4]

In the preferred embodiment of the invention, the operations described above with reference to FIG. 3 are performed by Microprocessor 26 operating under the direction of bus access routines, that is, sequences of bus access instructions, stored in Control Store 32. Microprocessor 26 in turn controls the operations of HBC 36 and HBI 38 which, as described above, receive bus status signals from Host Bus 14 and provide bus access and control signals to Host Bus 14.

As described, the present embodiment of the invention utilizes standard SCSI bus priority schemes which permit up to eight different hosts to be connected to the bus, with no two hosts having the same priority level. It is understood, however, that the present bus access control method may be used with other busses.

The present exemplary System 10 uses a Delay Count period of 2.2 microseconds and an N, that is, the initial Attempt and Delay period Count numbers, of 8 as the SCSI bus can support up to 8 hosts. It will be appreciated by those of ordinary skill in the art, however, that the Delay Count period will depend upon the specific bus scheme used for inter-host communication and upon the circuits used to implement the bus control and interface functions, for example, HBC 36.

Also, initial Attempt and Delay period count numbers other than 8 may be used; for example, in a system 4 hosts, an N of 4 could be suitable. Also, not all hosts need be assigned the same initial Attempt and Delay period count numbers. For example, certain high priority hosts may be assigned lower values of N, so that their maximum initial arbitration delays before gaining access to the bus are correspondingly shorter, while lower priority hosts may be assigned higher values of N. Judgement must be used in selecting varying values of N for the various hosts in the system, however, to retain the non-blocking feature of the present invention wherein no host may be locked out of bus access for excessive periods by higher priority hosts. For example, the N value assigned to higher priority hosts should be greater than the number of hosts assigned such lower N values, so that there can always be at least one Delay Count period in which no higher priority host has reached a Delay Count of zero.

Also, in yet other alternate embodiments the bus access controller may count from zero up to N, rather than from N down to zero, to determine when the total required arbitration delay period has elapsed.

It will also be appreciated that the design of BC 16 illustrated herein is only one of many possible bus controller designs which may utilize the present invention.

In addition, the invention may be implemented in circuitry rather than in a microprocessor operating under the control of stored bus access control routines.

Figure 4:
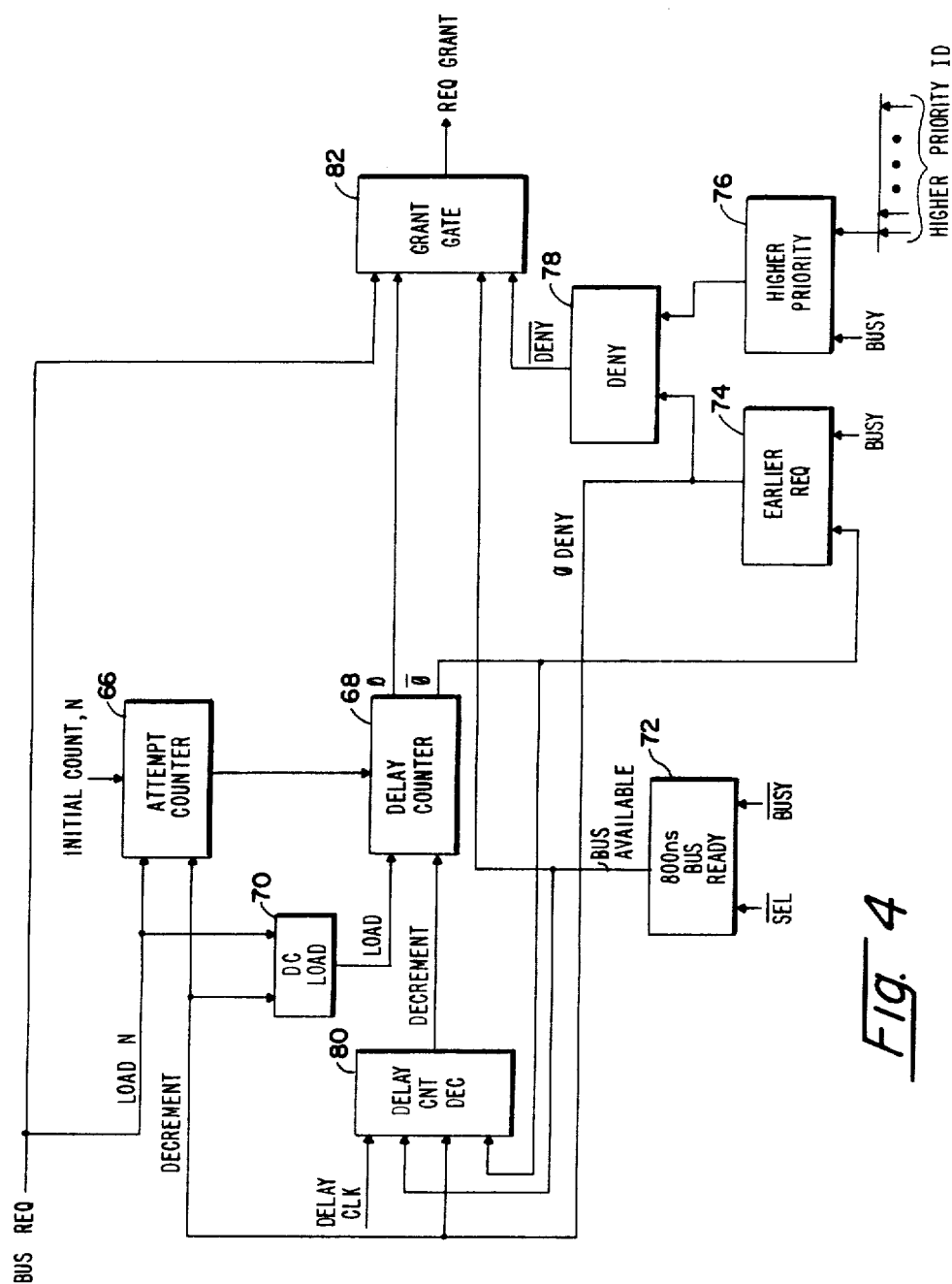

An example of such bus access control circuitry is illustrated in FIG. 4, which also serves as a further illustration of the invention.

Referring to FIG. 4, therein is represented the functional elements to perform the buss access control operations of the present invention. Detailed logic circuitry is not shown as there are many equally feasible logic circuits for implementing these functions, many of which will be familiar to those of ordinary skill in the art. It will be also appreciated by those of ordinary skill in the art that the functional elements represented in FIG. 4 may be equally implemented in firmware controlling general purpose logic elements, such as a microprocessor. The implementation illustrated in FIG. 2 is in fact the functional equivalent, as implanted in firmware controlling a microprocessor, of the logic elements illustrated in FIG. 4.

As represented therein, the bus access control circuitry includes an Attempt Counter 66 which tracks the number of attempts made by the host to obtain control of the bus. Also included is a Delay Counter 68, which tracks arbitration delay periods as previously described.

Attempt Counter 66 is loaded with the initial Attempt Count number N when the host asserts a Bus Request (BUS REQ) input indicating that the host is ready to perform a bus operation. This number N is then loaded into Delay Counter 68, as the number of required arbitration delay periods for the first attempt at bus access, by the BUS REQ operating through Delay Count Load gate (DC Load) 70, and the bus access control circuitry is ready for the first attempt to gain the bus.

As described, the arbitration delay count and attempt count operations are performed in response, in part, to the current status of the bus, that is, whether the bus in available and whether another host has requested control of the bus. Whether the bus is available is determined by 800 nanosecond (ns) Bus Ready Logic 72, which generates a Bus Available signal at the end of any 800 nanosecond (nsec) period in which SEL and BUSY have both been continuously low.

Whether another host has taken control of the bus is determined by Earlier Request gate (Earlier Req) 74 and Higher Priority gate (Higher Priority) 76. Earlier Req 74 receives a first input from Delay Counter 68 indicating whether the Delay Count has not yet reached zero and a BUSY input from the bus, indicating that another host has taken control of the bus. Earlier Req 74 generates a Bus Denied output (ODENY) if another host takes control of the bus before the present host's Delay Count Reaches zero.

Higher Priority 76 also receives the BUSY input from the bus, together with the identification bits (Higher Priority IDs) of those hosts having higher assigned priorities for bus access than the present host. Higher Priority 76 generates a PRIORITY DENY output whenever a host having a higher priority than the present host takes control of the bus. The ODENY output of Earlier Req 74 and the PRIORITY DENY output of Higher Priority 76 are combined by DENY gate 78 to generate a DENY output when another host takes control of the bus under either set of conditions.

As indicated, Delay Counter 68 receives a arbitration period clock DECREMENT input from Delay Count Decrement gate (Delay Cnt Dec) 80 which causes Delay Counter 68 to count down arbitration delay periods whenever the DECREMENT clock input is enabled by Delay Cnt Dec 80. This condition occurs when (a) the bus is available, as indicated by the BUS AVAILABLE output of 800 ns Bus Ready 72, (b) the bus has not been taken by another host before the Delay Count reaches zero, as indicated by the ODENY output of earlier Req 74, and (c) the Delay Count, that is, the arbitration delay period, has not reached zero. In short, Delay Counter 68 will count down the current arbitration delay period for the host while the bus is available.

If another host seizes the bus before the present arbitration delay period, that is, the Delay Count, of the host reaches zero, the ODENY signal will stop the count down of the current delay period and, acting through the DECREMENT input of Attempt Counter 66, decrement the value N stored in Attempt Counter 66. The ODENY signal, acting through DC Load 70, then loads the new DELAY COUNT from Attempt Counter 66 into Delay Counter 68 for the next attempt to gain control of the bus.

Once the Delay Count reaches zero, the DECREMENT clock input to Delay Counter 68 is disabled and the Delay Count remains at zero. At this point, the BUS REQ input from the host and the 0 output of Delay Counter 68 will enable a bus request to be generated from Access Grant Gate 80 whenever the bus is available, as indicated by BUS AVAILABLE from 800 ns Bus Ready 72 and another host with a higher priority has not taken the bus, as indicated by the PRIORITY DENY output of DENY 76. The output of Access Grant Gate 82 may be used, for example, to generate the BUSY and identification bit outputs of the host onto the bus.

It will be appreciated by those of ordinary skill in the art that the logic functions illustrated in FIG. 4 may be implemented in other ways and that many variations in operation are possible while remaining within the method of the invention. As described, the implementation illustrated in FIG. 4 may be equivalently implemented as firmware controlling a microprocessor. In further example, Attempt Counter 66 and Delay Counter 68 may be designed to count from zero up to N, rather than from N to zero, or Delay Counter 68 may count delay periods and the count in Delay Counter 68 compared to the number N stored in Attempt Counter 66. It is also apparent that, as described, N need not be identical for all hosts connected to the bus.

It will also be recognized that the circuitry shown in FIG. 4 is not shown in full detail as many details of the circuitry will be obvious to those of ordinary skill in the art. For example, the Delay Clock would be used to gate the sampling of the bus state by 800 ns Bus Ready 72, as well as many of the other gating operations, to avoid unwanted incidental outputs. In a similar manner, the counting operation of Delay Counter 68 would be gated be the BUS REQ signal to prevent unwanted incidental outputs.

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

We claim:

1. In a data processing system having a plurality of host processors connected to a communications bus, wherein each host may take control of the bus by asserting control signals on the bus and includes a bus access control means responsive to bus access request signals generated by the host for asserting the control signals on the bus, a method for controlling access to the bus by a host, comprising the steps of:

in the bus access control means,
- (a) in an attempt count means and responsive to a bus request by the host, storing an initial number N of delay periods,
- (b) in a bus state means connected from the bus and responsive to control signals on the bus, providing a signal indicating whether the bus is available, and
- (c) in the attempt counter means and responsive to the bus availability signal if the bus is not available, decrementing the number N stored in the attempt counter means to provide a new number N less than the previous N and returning to step (b),
- (d) in a delay counter means and responsive to the bus availability signal if the bus is available, counting a delay period and,
- (e) in a control signal means, comparing the counted number of delay periods with the current number N of delay periods, and
if the counted number of delay periods is not equal to the current number N, returning to step (b), and
- (f) if the counted is equal to the current number N, asserting control signals to take control of the bus.

2. The method of claim 1 wherein the control signals on the bus include signals indicating the identities of hosts requesting access to the bus and the hosts have relative priorities of access and wherein the comparison means further has inputs connected from the bus signals indicating the identities of the hosts, further comprising the steps of:
- (g) in the control signal means and when the counted number of delay periods is equal to the current number N, determining whether another host having a higher priority of access to the bus is asserting control of the bus, and
- (h) if no higher priority host is asserting control of the bus, asserting the control signals to take control of the bus, and
- (i) if a higher priority host is asserting control of the bus and responsive to the bus availability signal, determining when the bus next becomes available, and
- (j) returning to step (g).

3. The method of claim 2 wherein the initial number N stored in the attempt count means of the host may be different from the initial number N stored in the attempt count means of other host processors in the system and connected to the bus.

4. The method of claim 1 wherein the bus conforms to the Small Computer System Interface (SCSI) specification.

5. The method of claim 1 wherein the initial number N stored in the attempt count means of the host may be different from the initial number N stored in the attempt count means of other host processors in the system and connected to the bus.

6. In a data processing system having a plurality of host processors connected to a communications bus, wherein each host may take control of the bus by asserting control signals on the bus, means for controlling access to the bus by a host, comprising:

bus state means connected from the bus control signals and responsive to the control signals on the bus for providing a bus availability signal indicating whether the bus is available, delay counting means having a first input connected from the bus state means and a second input connected from the host and responsive to the bus availability signal and the occurrence of a bus access request from by the host for counting delay periods during successive access attempt intervals, wherein an access attempt interval is any period after the host has asserted a request for access to the bus wherein the bus is available for access and the host has not yet obtained access to the bus, attempt count means having an input connected from the host and responsive to a host request for bus access for storing an initial number N of delay periods, and control signal means having inputs connected from the host, the delay counting means, the attempt count means and the bus state means and responsive to the bus access request, the number of delay periods counted by the delay counting means and the bus availability signal for asserting bus control signals during an access attempt interval when the number of counted delay periods equals the current number N and the bus is available, and a bus denied signal when another host assumes control of the bus before the number of counted delay periods equals the current number N, the attempt count means having an input connected from the control signal means and being responsive the bus denied signal for generating and providing a new number N less than the previous N when the host is denied access to the bus during an attempt access interval.

7. The bus access control means of claim 6 wherein the control signals on the bus include signals indicating the identities of hosts requesting access to the bus and the hosts have relative priorities of access, and wherein:

the control signal means has inputs connected from the bus control signals indicating the identities of other hosts of the system and is responsive to the host identity signals asserted by another host to assert the bus control signals when bus control signals are not asserted by a host having a higher priority of access to the bus.

8. The bus access control means of claim 6 wherein the bus conforms to the Small Computer System Interface (SCSI) specification.

9. The bus access control means of claim 6 wherein the initial number N stored in the attempt count means of the host may be different from the initial number N stored in the attempt count means of other host processors in the system and connected to the bus.

10. The bus access control means of claim 7 wherein the initial number N stored in the attempt count means of the host may be different from the initial number N stored in the attempt count means of other host processors in the system and connected to the bus.

11. In a data processing system having a plurality of host processors connected to a communications bus, wherein each host may take control of the bus by asserting control signals on the bus and includes a bus access control means responsive to bus access request signals generated by the host for asserting the control signals on the bus, a method for controlling access to the bus by a host, comprising the steps of:

in the bus access control means, (a) in an attempt count means and responsive to a bus request by the host, storing an initial number N of delay periods, (b) loading the initial number N into a delay counter means, (c) in a bus state means connected from the bus and responsive to control signals on the bus, providing a signal indicating whether the bus is available, and (d) in a control signal means and responsive to the bus availability signal if the bus is not available, decrementing the number N stored in the attempt counter means to provide a new number N less than the previous N, loading the new number N into the delay counter means and returning to step (c), (e) in the delay counter means and responsive to the bus availability signal if the bus is available, decrementing the current number N stored in the delay counter means and, (f) in the control signal means, determining whether the decremented number N stored in the delay counter means is zero, and if the decremented number N stored in the delay counter means is not zero, returning to step (c), and (g) if the decremented number N stored in the delay counter means is zero, asserting control signals to take control of the bus.

12. The method of claim 11 wherein the control signals on the bus include signals indicating the identities of hosts requesting access to the bus and the hosts have relative priorities of access and wherein the comparison means further has inputs connected from the bus signals indicating the identities of the hosts, further comprising the steps of:

(h) in the control signal means and when the decremented number N stored in the delay counter means is zero, determining whether another host having a higher priority of access to the bus is asserting control of the bus, and (i) if no higher priority host is asserting control of the bus, asserting the control signals to take control of the bus, and (j) if a higher priority host is asserting control of the bus and responsive to the bus availability signal, determining when the bus next becomes available, and (k) returning to step (h).

13. In a data processing system having a plurality of host processors connected to a communications bus, wherein each host may take control of the bus by asserting control signals on the bus, means for controlling access to the bus by a host, comprising:

bus state means connected from the bus control signals and responsive to the control signals on the bus for providing a bus availability signal indicating whether the bus is available, delay counting means having a first input connected from the bus state means and a second input connected from the host and responsive to the bus availability signal and the occurrence of a bus access request from by the host for counting delay periods during successive access attempt intervals, wherein an access attempt interval is any period after the host has asserted a request for access to the bus wherein the bus is available for access and the host has not yet obtained access to the bus, attempt count means having an input connected from the host and responsive to a host request for bus access for storing an initial number N of delay periods, and control signal means having inputs connected from the host, the delay counting means, the attempt count means and the bus state means and responsive to the bus access request, the number of delay periods counted by the delay counting means and the bus availability signal for asserting bus control signals during an access attempt interval when the number of counted delay periods equals the current number N and the bus is available, and a bus denied signal when another host assumes control of the bus before the number of counted delay periods equals the current number N, the attempt count means having an input connected from the control signal means and being responsive the bus denied signal for generating and providing a new number N less than the previous N when the host is denied access to the bus during an attempt access interval.

14. The bus access control means of claim 13 wherein the control signals on the bus include signals indicating the identities of hosts requesting access to the bus and the hosts have relative priorities of access, and wherein:

the control signal means has inputs connected from the bus control signals indicating the identities of other hosts of the system and is responsive to the host identity signals asserted by another host to assert the bus control signals when bus control signals are not asserted by a host having a higher priority of access to the bus.

* * * * *